(12) United States Patent
Wissell

(10) Patent No.: US 7,145,401 B2
(45) Date of Patent: Dec. 5, 2006

(54) METHOD FOR THE DETECTION OF AN INCORRECT OSCILLATOR FREQUENCY AND CLOCK GENERATION SYSTEM

(75) Inventor: Daniel Wissell, Acton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 78 days.

(21) Appl. No.: 11/040,287

(22) Filed: Jan. 21, 2005

(65) Prior Publication Data
US 2006/0164175 A1    Jul. 27, 2006

(51) Int. Cl.
*H03B 1/00* (2006.01)
(52) U.S. Cl. ........................................ 331/49
(58) Field of Classification Search .................. 331/46, 331/49, 107 A, 173, 175, 187; 327/294, 327/298
See application file for complete search history.

(56) References Cited

U.S. PATENT DOCUMENTS 6,259,329 B1 *  7/2001  Saito ........................... 331/49

* cited by examiner

Primary Examiner—David Mis

(57) ABSTRACT

In one embodiment, a clock generation system comprises a redundant clock source (RCS) device for receiving multiple timing signals and for generating at least one clock from the timing signals for distribution to other circuits, and first and second oscillator devices, wherein the RCS device switches between timing signals from the first and second oscillator devices in response to timing signal failure, wherein the RCS device filters timing signals from the first and second oscillator devices using respective bandpass filters to detect an incorrect oscillator frequency.

27 Claims, 3 Drawing Sheets

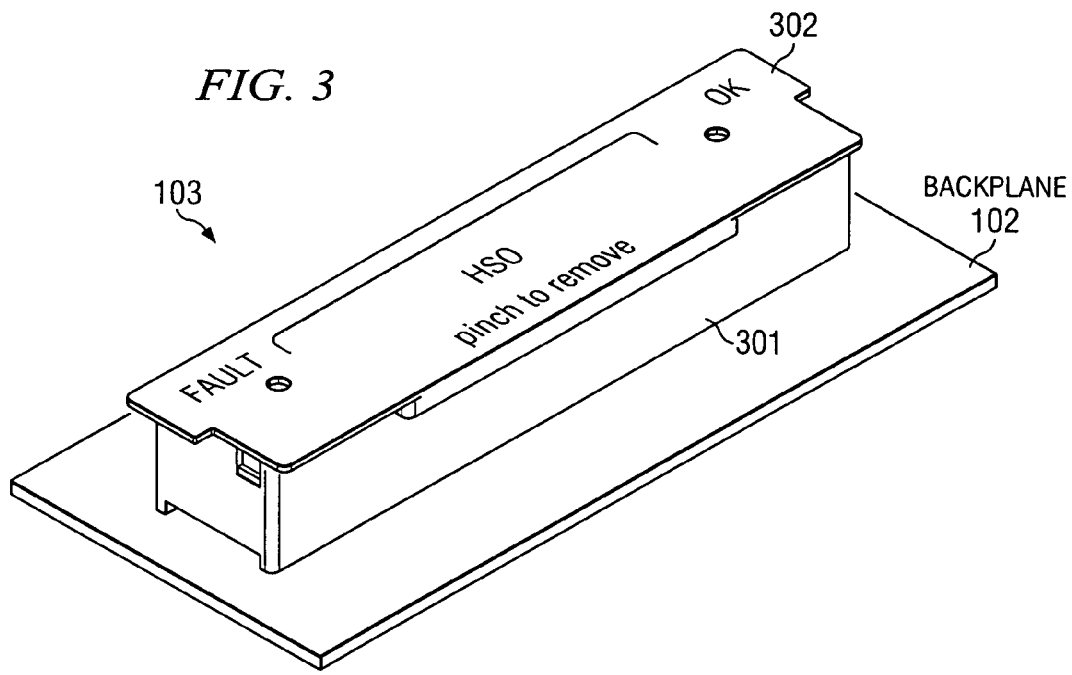
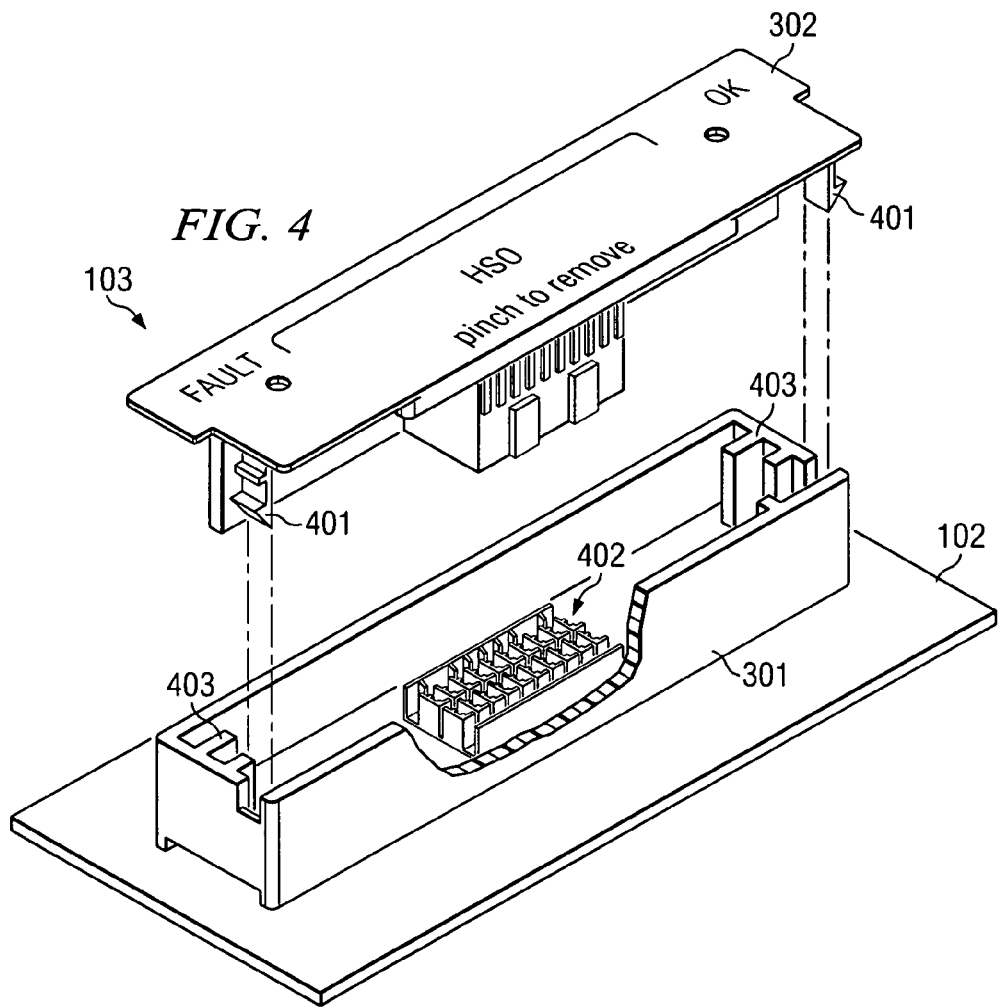

METHOD FOR THE DETECTION OF AN INCORRECT OSCILLATOR FREQUENCY AND CLOCK GENERATION SYSTEM

TECHNICAL FIELD

The present application is generally related to detection of an incorrect oscillator frequency.

BACKGROUND

Electronic equipment systems employ clock sources to control the timing of logic components within the systems. In traditional systems, a clock generation module or card is employed on the backplane of the system to distribute one or several clocks through the backplane to each chassis card. The clock generation module may include an oscillator crystal driving a phase-locked loop. The clock generation module may also possess various filtering circuits and clock duplication functionality.

The traditional approach created a single point of failure for the supported system. Specifically, if the clock module malfunctioned for any reason, the entire system would cease to function. Accordingly, redundant clock generation designs have been implemented. In one example, a clock generation module includes two oscillator crystals. During ordinary operation, one of the oscillator crystals is used as a master device to generate the clock for distribution and the other oscillator operates in synchronization. If the master oscillator fails for any reason, circuitry within the clock module detects the failure and switches the clock generation to the timing signal generated by the secondary oscillator.

SUMMARY

In one embodiment, a clock generation system comprises a redundant clock source (RCS) device for receiving multiple timing signals and for generating at least one clock from the timing signals for distribution to other circuits, and first and second oscillator devices, wherein the RCS device switches between timing signals from the first and second oscillator devices in response to timing signal failure, wherein the RCS device filters timing signals from the first and second oscillator devices using respective bandpass filters to detect an incorrect oscillator frequency.

In another embodiment, a method of performing clock generation for electronic equipment comprises coupling a plurality of oscillator devices to a backplane, generating a clock for distribution through the backplane from a timing signal received from one of the plurality of oscillator devices, and switching to a timing signal from another oscillator device for generation of the clock in response to detection of an incorrect frequency of operation of the oscillator device, wherein the detection of the incorrect frequency occurs by filtering the timing signal by a bandpass filter.

In another embodiment, a system comprises a redundant clock generation system that receives multiple timing signals to generate a clock for distribution with the system, and a plurality of bandpass filters for filtering the multiple timing signals for detection of an incorrect operating frequency.

BRIEF DESCRIPTION OF THE DRAWINGS

FIG. 3 depicts a fully assembled hot-swappable oscillator device coupled to a backplane according to one representative embodiment.

FIG. 4 depicts a disassembled hot-swappable oscillator device according to one representative embodiment.

DETAILED DESCRIPTION

Some representative embodiments are directed to systems and methods for detecting improper operation of a clock oscillator. Specifically, some representative embodiments employ one or several passive bandpass filters within a clock sense logic module. For example, surface acoustic wave (SAW) filters may be employed. The center frequency of the passive bandpass filters corresponds to the desired oscillator frequency. The output of each filter drops significantly when the oscillator operating frequency drifts outside a predetermined range. An error signal is generated when the output of the filter falls below a predetermined amount.

In some embodiments, the error signal is used to cause a redundant clock source to switch between a plurality of oscillators. In one embodiment, the redundant clock source element receives timing signals from a plurality of hot-swappable oscillator devices. The redundant clock source element utilizes the timing signal of one of the hot-swappable oscillator devices to distribute one or several clocks to a backplane of a computer system or other suitable electronic equipment. The redundant clock source processes the received timing signal to ensure that the respective oscillator device is functioning properly. If the oscillator device ceases to function or begins to function improperly (e.g., generates a signal having an incorrect frequency), the redundant clock source switches to a timing signal from another hot-swappable oscillator device. The malfunctioning hot-swappable oscillator device may then be removed and replaced without ceasing the operation of the system.

Figure 1:
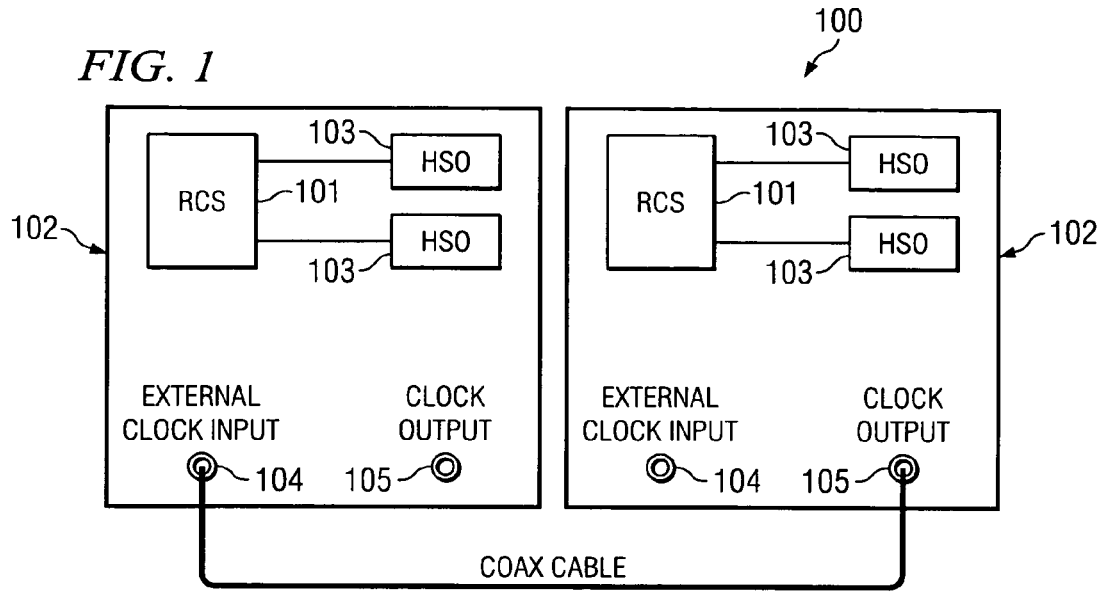
FIG. 1 depicts an electronic system according to one representative embodiment.

Referring now to the drawings, FIG. 1 depicts electronic system 100 having multiple backplanes 102 according to one representative embodiment. Backplane 102 is a circuit board that contains sockets or expansion slots where other computer boards can be connected. Each backplane 102 of system 100 includes a respective redundant clock source 101. Redundant clock source 101 receives multiple timing signals. From one of the timing signals, redundant clock source 101 generates a clock for distribution through backplane 102 for provision to suitable circuits and devices. Redundant clock source 101 may perform electrical filtering of the clock as appropriate. Furthermore, redundant clock source 101 may perform clock duplication depending upon the number of clocks supported by a given system or platform. When providing multiple clocks, redundant clock source 101 may perform multiplication and division of the clock frequency as appropriate for particular system specifications. Also, each backplane 102 may include input port 104 for receiving a clock signal from another backplane to enable synchronization of clocks. Likewise, each backplane 102 may include output port 105 for this purpose.

A plurality of hot-swappable oscillator devices 103 communicate respective timing signals generated by their crystal oscillators through backplane 102 to redundant clock source 101. Furthermore, respective signals are communicated from hot-swappable oscillator devices 103 to redundant clock source 101 indicating whether hot-swappable oscillator devices 103 are fully connected to backplane 102 as will be discussed in greater detail below.

Figure 2:
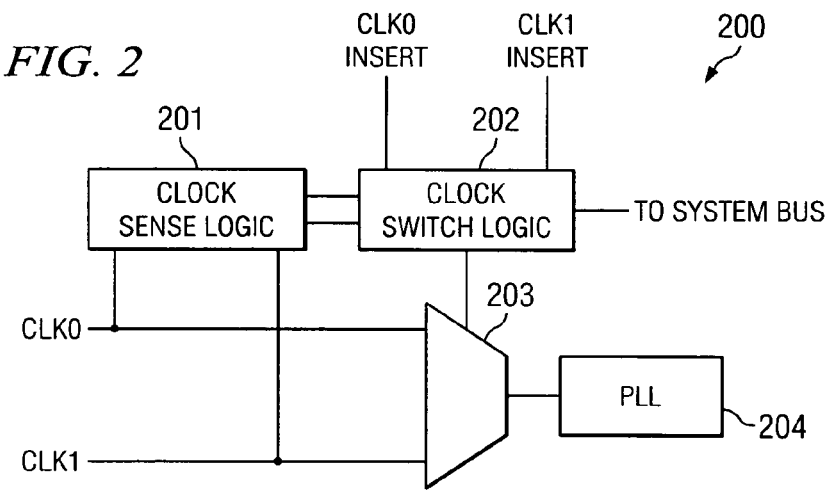
FIG. 2 depicts a circuit for inclusion within a redundant clock source according to one representative embodiment.

FIG. 2 depicts circuit 200 for inclusion within redundant clock source 101 according to one representative embodiment. Circuit 200 processes the timing signals (shown as CLK0 and CLK1) received from hot-swappable oscillator devices 103. Specifically, circuit 200 switches between the two signals as appropriate using, for example, multiplexer 203 to drive phase-locked loop 204. The clock or clocks for distribution are derived from the output of phase-locked loop 204.

Circuit 200 selects the respective timing signal using clock sense logic 201 and switch logic 202. Clock sense logic 201 determines the signal characteristics of the timing signals. In some embodiments, clock sense logic 201 detects multiple timing signal failure modes. Clock sense logic 201 may detect a "no output" characteristic, i.e., the respective oscillator device 103 has completely failed. Also, clock sense logic 201 may detect a "stuck-at" condition in which the output of a respective oscillator device 103 is substantially constant. Furthermore, clock sense logic 201 may detect when the operating frequency of a respective oscillator device 103 varies from a predetermined range.

In some embodiments, a respective passive bandpass filter is used to filter the output signal from each oscillator device 103. Each bandpass filter has a center frequency that corresponds to the desired operating frequency of the oscillator devices 103. Additionally, the bandwidth of the bandpass filters is related to the frequency tolerance of the system. Accordingly, when an oscillator device 103 operates at a frequency outside of the frequency tolerance, the improper frequency is detected by an appreciably reduced signal level at the output of the filter.

When a timing signal exhibits an undesirable characteristic, clock sense logic 201 (also shown in FIG. 7) communicates a signal to switch logic 202 to indicate that the respective timing signal should not be used to derive the clock(s). Switch logic 202 responds by causing the other timing signal to be provided to phase-locked loop 204.

Switch logic 202 further controls the provision of timing signals to phase-locked loop 204 in response to insertion and removal of hot-swappable oscillator devices 103. When a first hot-swappable oscillator device 103 is fully engaged, a suitable signal (CLK0 INSERT or CLK1 INSERT) is communicated to switch logic 202. Switch logic 202 causes the timing signal from the inserted hot-swappable oscillator device 103 to be provided to phase-locked loop 204. After two hot-swappable oscillator devices 103 have been inserted, switch logic 202 responds to the removal of one of the hot-swappable oscillator devices 103. When one of the signals CLK0 INSERT and CLK1 INSERT is no longer provided to switch logic 202, switch logic 202 causes the timing signal associated with the other hot-swappable oscillator device 103 to be provided to phase-locked loop 204.

If a hot-swappable oscillator device 103 is detected as providing a timing signal with an undesirable characteristic or is detected as removed, switch logic 202 communicates a suitable signal through the system bus. The signal may be detected by the operating system to indicate to an administrator that appropriate action should be taken.

FIG. 3 depicts a fully assembled hot-swappable oscillator device 103 coupled to backplane 102 according to one representative embodiment. As seen in FIG. 3, hot-swappable oscillator device 103 includes base housing 301 that is mechanically coupled to backplane 102. Cover element 302 is inserted within base housing 301. Base housing 301 and cover element 302 enclose the oscillator crystal and related circuitry. Cover element 302 includes a plurality of light emitting diodes (LEDs) to indicate the functional state of hot-swappable oscillator device 103.

If the oscillator of hot-swappable oscillator device 103 ceases to function properly, cover element 302 can be removed from base housing 301 by manual depression of the side walls of cover element 302. Specifically, application of pressure displaces latches 401 thereby releasing cover element 302 as shown in FIG. 4. As seen by the removal of cover element 302, base housing 301 includes guides 403 for receiving a circuit board to which an oscillator unit is attached. Guides 403 align the oscillator unit to be coupled within header 402.

Header 402 provides a multi-level interconnect. One of the levels of the interconnect enables the presence of the oscillator unit (not shown) to be detected. A second level of the interconnect enables the timing signal generated by the oscillator unit to be communicated to redundant clock source 101 through backplane 102. The first level of the interconnect is shorter than the second level. When the oscillator unit is being removed from header 402, the first level of the interconnect is disconnected first. Accordingly, redundant clock source 101 switches timing signals in response to the disconnection of the first level of the interconnect of header 402 before the second level of the interconnect loses contact.

Figure 5:
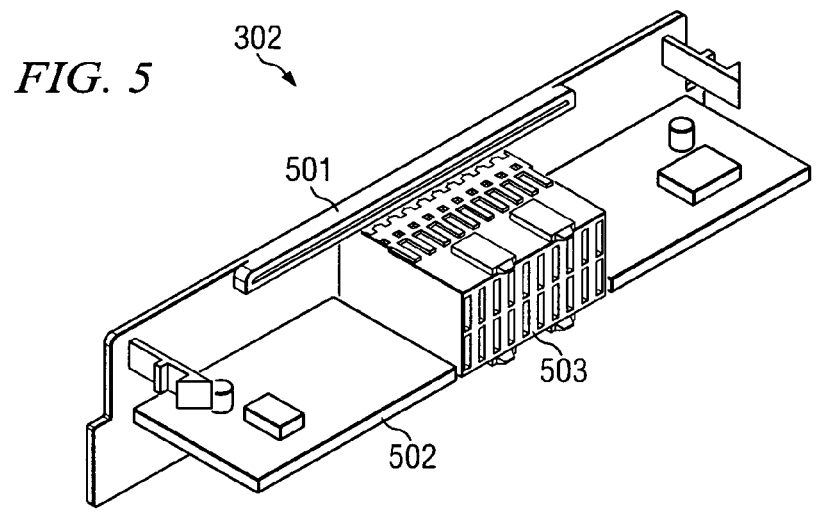
FIG. 5 depicts a cover element according to one representative embodiment.

FIG. 5 depicts a "rear" view of cover element 302 that includes mechanical portion 501, circuit board 502, and oscillator unit 503. Oscillator unit 503 is coupled to circuit board 502. Oscillator unit 503 includes the oscillator crystal and related circuitry. Oscillator unit 503 also includes an interconnect for coupling with header 402. Circuit board 502 may be coupled to mechanical portion 501 using plastic rivets or other suitable fasteners.

Figure 6:
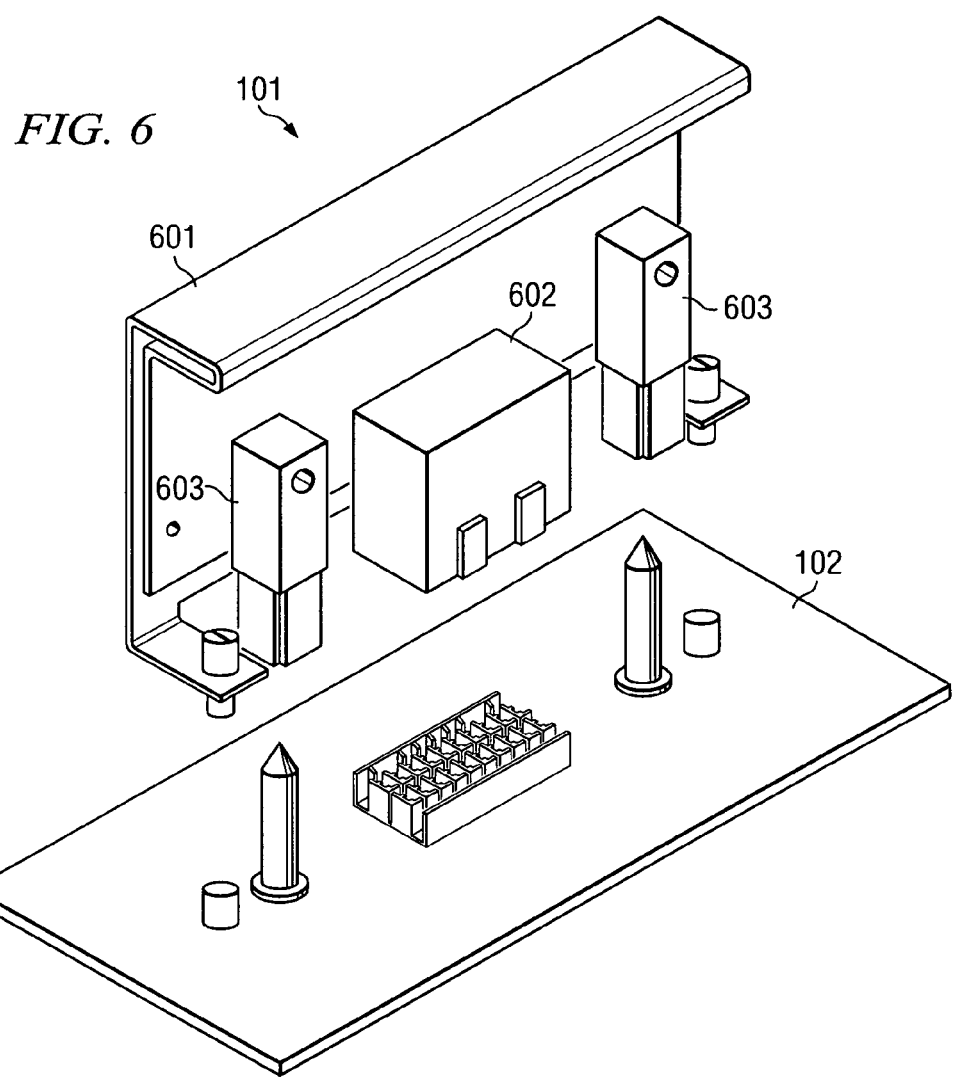
FIG. 6 depicts a redundant clock source implemented according to one representative embodiment.

In another representative embodiment, redundant clock source 101 is implemented to be connected to backplane 102 in a manner that is similar to the connection of hot-swappable oscillator devices 103. FIG. 6 depicts redundant clock source 101 implemented in this manner. Redundant clock source 101 includes circuit board 601 to which redundant clock source unit 602 is attached. Redundant clock source unit 602 encloses the clock processing circuitry for coupling with an interconnect. Redundant clock source 101 further includes alignment structures 603 to facilitate attachment of redundant clock source 101 during coupling with the interconnect.

Figure 7:
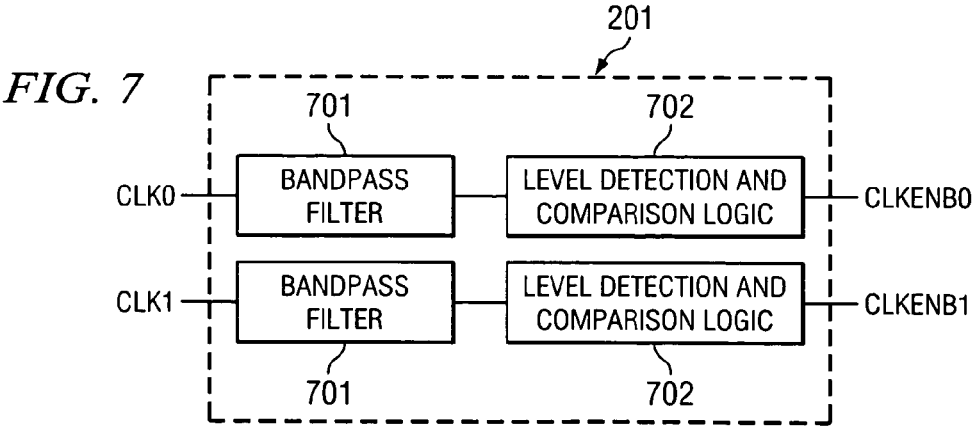
FIG. 7 depicts clock sense logic according to one representative embodiment.

FIG. 7 depicts clock sense logic 201 according to one representative embodiment. Clock sense logic 201 receives signals CLK0 and CLK1 from HSOs 103. Each signal is filtered by a respective bandpass filter 701. Bandpass filter 701 possesses a center frequency that corresponds to the desired operating frequency of HSOs 103. The bandwidth of filter 701 is related to the acceptable frequency tolerance associated HSOs 103. In another embodiment, filter 701 may be adapted to accommodate operation of HSOs 103 at multiple frequencies. For example, a comb filter design may be employed with each bandpass region corresponding to a respective operating frequency of HSOs 103. When a timing signal deviates from the acceptable frequency range, the output level of bandpass filter 701 is significantly attenuated. Likewise, when a no-output condition occurs, the output of bandpass filter 701 is zero. Furthermore, when a stuck-at condition occurs, the output of bandpass filter 701 is approximately zero since bandpass filter 701 removes the DC stuck-at signal.

In some representative embodiments, bandpass filters 701 are implemented using SAW filter designs. SAW filters typically include input and output transducers deposited on a highly polished piezoelectric substrate. The transducers are typically thin aluminum interdigital electrodes connected to bus pads. When a RF signal is applied across the bus pads, stress and strain are produced in the crystal producing a surface acoustic wave that propagates along the substrate. The acoustic wave is then converted into electrical energy at the output transducer. The frequency response is essentially a digital finite impulse response based on the set of electrode weightings. The electrodes permit a large number of filter zeros to be readily implemented thereby enabling a very steep-shaped filter with linear phase.

Level detection and comparison logic elements 702 are used to detect the output levels of filters 701. Also, logic elements 702 compare the detected output levels to a threshold level. When the detected output levels are greater than the threshold, output signals (CLKENB0 and CLKENB1) from elements 702 indicate that the respective HSOs 103 are operating properly. When one of the detected output levels falls below the threshold, the respective output signal indicates failure of the corresponding HSO 103.

In some representative embodiments, if an oscillator unit fails for any reason, the electronic equipment continues to function without interruption. Some representative embodiments increase the availability of computer servers, telecom equipment, and/or the like. Furthermore, when an oscillator unit fails, the electronic system need not be taken offline to service the failed oscillator unit. Instead, representative embodiments enable a hot-swappable oscillator device to be removed from the system during operation of the system. Moreover, the mechanical implementation causes the replacement of a failing hot-swappable oscillator device to occur in an efficient manner. An LED on the oscillator device signals to the field technician which devices should be replaced. Also, the oscillator unit can be easily retrieved by manual depression of the device housing. Furthermore, the oscillator unit can be replaced by switching out circuit boards from the device cover.

Moreover, some representative embodiments enable an efficient and robust redundant clock system to be employed in computer systems and other electronic systems. In particular, frequency-deviation failure modes are typically not detected by known designs due to the complex circuitry and firmware previously required. Instead, some representative embodiments employ a passive circuit element (i.e., the SAW filter) to enable frequency detection to occur. Accordingly, system complexity is maintained at a relatively low level without compromising the robustness of the redundant design.

What is claimed is:

1. A clock generation system, comprising:
  a redundant clock source (RCS) device for receiving multiple timing signals and for generating at least one clock from said timing signals for distribution to other circuits; and
  first and second oscillator devices;
  wherein said RCS device switches between timing signals from said first and second oscillator devices in response to timing signal failure, wherein said RCS device filters timing signals from said first and second oscillator devices using respective bandpass filters to detect an incorrect oscillator frequency.

2. The clock generation system of claim 1 wherein said bandpass filters are surface acoustic wave (SAW) filters.

3. The clock generation system of claim 1 wherein said bandpass filters are comb filters.

4. The clock generation system of claim 1 wherein said bandpass filters possess a center frequency that corresponds to a desired operating frequency associated with said first and second oscillator devices.

5. The clock generation system of claim 1 wherein said RCS device comprises respective logic elements for determining output levels associated with said bandpass filters and for comparing said output levels to a threshold value.

6. The clock generation system of claim 1 further comprising:
  an external input port for receiving a clock from another circuit, wherein said RCS synchronizes said at least one clock to said received clock.

7. The clock generation system of claim 1 further comprising:
  an external output port for providing said at least one clock to another circuit.

8. The clock generation system of claim 1 wherein each of said first and second oscillator devices comprise a base housing and an oscillator unit for generating a timing signal, said base housing including an interconnect for coupling to said oscillator unit, said interconnect providing a first connection for said timing signal and providing a second connection to enable detection of insertion and removal of said oscillator unit.

9. The clock generation system of claim 8 wherein said base housing comprises a guide structure for receiving said oscillator board to align said oscillator unit to couple with said interconnect.

10. The clock generation system of claim 8 wherein each of said first and second oscillator devices comprises a cover element that has an oscillator board coupled to said oscillator unit.

11. The clock generation system of claim 10 wherein said cover element comprises a plurality of latches for mechanically coupling said cover element to said base housing that are releasable by manual depression.

12. The clock generation system of claim 10 wherein said cover element comprises a light emitting element to indicate a functional state of said oscillator unit.

13. The clock generation system of claim 1 wherein said oscillator devices are hot swappable devices.

14. A method of performing clock generation for electronic equipment, comprising:
  coupling a plurality of oscillator devices to a backplane;
  generating a clock for distribution through said backplane from a timing signal received from one of said plurality of oscillator devices; and
  switching to a timing signal from another oscillator device for generation of said clock in response to detection of an incorrect frequency of operation of said oscillator device, wherein said detection of said incorrect frequency occurs by filtering said timing signal by a bandpass filter.

15. The method of claim 14 wherein said detection compares an output level of said bandpass filter to a threshold value.

16. The method of claim 14 wherein said bandpass filter is a surface acoustic wave (SAW) filter.

17. The method of claim 14 wherein said bandpass filter is a comb filter.

18. The method of claim 14 wherein said bandpass filter possesses a center frequency that corresponds to a desired operating frequency of said oscillator devices.

19. The method of claim 14 further comprising:
providing said clock to an external port for communication to another backplane.

20. The method of claim 14 further comprising:
providing an error signal indicating that said oscillator device has generated a timing signal having an incorrect frequency of operation.

21. A system comprising:
a redundant clock generation system that receives multiple timing signals to generate a clock for distribution with said system; and
a plurality of bandpass filters for filtering said multiple timing signals for detection of an incorrect operating frequency.

22. The system of claim 21 wherein said plurality of bandpass filters possess a center frequency that corresponds to desired operating frequency of said system.

23. The system of claim 21 wherein said plurality of bandpass filters are surface acoustic wave (SAW) filters.

24. The system of claim 21 wherein said plurality of bandpass filters are comb filters.

25. A clock generation system, comprising:
first and second means for generating timing signals;
means for receiving multiple timing signals and for generating at least one clock from said timing signals for distribution to circuits of said clock generation system, wherein said means for receiving switches between timing signals from said first and second means for generating in response to timing signal failure; and
means for filtering timing signals from said first and second means for generating to detect an incorrect oscillator frequency.

26. The clock generation system of claim 25 wherein means for filtering possesses a center frequency that corresponds to a desired operating frequency associated with said first and second oscillator means for generating.

27. The clock generation system of claim 25 wherein said means for receiving comprises:
means for detecting an output level from said means for filtering.

* * * * *